(12) United States Patent
Tsuchida et al.

(10) Patent No.: US 11,499,632 B2
(45) Date of Patent: Nov. 15, 2022

(54) HYDRAULIC CONTROL DEVICE FOR AUTOMATIC TRANSMISSION

(71) Applicant: AISIN CORPORATION, Kariya (JP)

(72) Inventors: Kenichi Tsuchida, Nishio (JP); Koji Makino, Okazaki (JP); Toshiaki Hayashi, Toyohashi (JP); Fumiaki Aikawa, Anjo (JP); Harunobu Umemura, Okazaki (JP)

(73) Assignee: AISIN CORPORATION, Kariya (JP)

( * ) Notice: Subject to any disclaimer, the term of this patent is extended or adjusted under 35 U.S.C. 154(b) by 578 days.

(21) Appl. No.: 16/480,850

(22) PCT Filed: Mar. 30, 2018

(86) PCT No.: PCT/JP2018/013969
§ 371 (c)(1),
(2) Date: Jul. 25, 2019

(87) PCT Pub. No.: WO2018/182012
PCT Pub. Date: Oct. 4, 2018

(65) Prior Publication Data
US 2019/0390768 A1 Dec. 26, 2019

(30) Foreign Application Priority Data
Mar. 31, 2017 (JP) .............................. JP2017-072147

(51) Int. Cl.
*F16H 61/662* (2006.01)
*F16H 61/12* (2010.01)
*F16H 61/14* (2006.01)

(52) U.S. Cl.
CPC ....... *F16H 61/66272* (2013.01); *F16H 61/12* (2013.01); *F16H 61/14* (2013.01); *F16H 2061/1252* (2013.01)

(58) Field of Classification Search
CPC .... F16H 61/66272; F16H 61/12; F16H 61/14; F16H 2061/1252; F16H 61/32; F16H 61/0021; F16H 61/4008
See application file for complete search history.

(56) References Cited

U.S. PATENT DOCUMENTS 8,012,051 B2 * 9/2011 Soga ...................... F16H 61/12
   474/18
8,070,650 B2 * 12/2011 Ogata ............... F16H 61/66259
   477/48

FOREIGN PATENT DOCUMENTS

JP   H3-189467 A   8/1991
JP   H06-42625 A   2/1994
JP   2010-286052 A  12/2010

OTHER PUBLICATIONS

JP2010286052A (Ishikawa, 2010, machine translation).*
Jun. 26, 2018 International Search Report issued in International Patent Application No. PCT/JP2018/013969.

* cited by examiner

*Primary Examiner* — Tinh Dang
(74) *Attorney, Agent, or Firm* — Oliff PLC (57) ABSTRACT

A hydraulic control device that includes a primary pressure control valve that has a first valve element and that regulates the primary pressure by varying a position of the first valve element in accordance with operation of a first electromagnetic actuator; a secondary pressure control valve that has a second valve element and that regulates the secondary pressure by varying a position of the second valve element in accordance with operation of a second electromagnetic actuator; and a fail-safe valve that varies the position of the first valve element such that the primary pressure is reduced when the first electromagnetic actuator and the second electromagnetic actuator become inoperable.

14 Claims, 3 Drawing Sheets

HYDRAULIC CONTROL DEVICE FOR AUTOMATIC TRANSMISSION

BACKGROUND

The present disclosure relates to a hydraulic control device for an automatic transmission.

There has hitherto been known an automatic transmission (belt-type CVT) that includes a primary pulley, a secondary pulley, and an endless belt wound around the two pulleys, in which the respective positions of a movable sheave of the primary pulley and a movable sheave of the secondary pulley in the axial direction are hydraulically controlled to continuously vary the respective winding diameters of the belt around the primary pulley and the secondary pulley, that is, the speed ratio.

A hydraulic control device that improves the durability of the belt and the pulleys by reducing the hydraulic pressure to be applied to the movable sheaves during a failure of a hydraulic control valve is known as a hydraulic control device for such an automatic transmission (JP 2010-286052 A).

SUMMARY

Some automatic transmissions are configured such that the winding diameter of the belt around one of the primary pulley and the secondary pulley is larger than the winding diameter of the belt around the other in the case where an equal hydraulic pressure acts on the movable sheaves.

In such automatic transmissions, the winding diameter around one of the primary pulley and the secondary pulley is larger than the winding diameter around the other when an equal hydraulic pressure acts on the movable sheaves during a failure of a hydraulic control valve, and if working oil is continuously supplied while there is continuously a difference between the belt winding diameters, there may be concentration of the bending stress on the belt around the pulley with the smaller winding diameter compared to the pulley with the larger winding diameter. Hence, in order to endure such a situation, the rigidity and the strength of the belt and the pulleys are increased, which may incur an increase in the size of the belt and the pulleys.

An exemplary aspect of the disclosure obtains a hydraulic control device for an automatic transmission that can improve the durability of a belt and pulleys while suppressing an increase in the size or the weight of such components.

The present disclosure provides a hydraulic control device for an automatic transmission that has, for example, a primary pulley that includes a primary fixed sheave and a primary movable sheave, a secondary pulley that includes a secondary fixed sheave and a secondary movable sheave, and an endless belt wound as interposed between the primary fixed sheave and the primary movable sheave and wound as interposed between the secondary fixed sheave and the secondary movable sheave, the automatic transmission being configured such that a winding diameter of the belt around the primary pulley is larger than a winding diameter of the belt around the secondary pulley in the case where a primary pressure for varying a position of the primary movable sheave in an axial direction and a secondary pressure for varying a position of the secondary movable sheave in the axial direction are equal to each other, the hydraulic control device including: a primary pressure control valve that has a first valve element and that regulates the primary pressure by varying a position of the first valve element in accordance with operation of a first electromagnetic actuator; a secondary pressure control valve that has a second valve element and that regulates the secondary pressure by varying a position of the second valve element in accordance with operation of a second electromagnetic actuator; and a fail-safe valve that varies the position of the first valve element such that the primary pressure is reduced in the case where the first electromagnetic actuator and the second electromagnetic actuator become inoperable.

According to the above configuration, the respective belt winding diameters around the primary pulley and the secondary pulley can be made equal to each other through hydraulic control during a failure. Hence, the durability of the belt and the pulleys can be improved while suppressing an increase in the size or the weight of the belt and the pulleys, for example.

DETAILED DESCRIPTION OF EMBODIMENTS

Exemplary embodiments of the present disclosure will be disclosed below. The configuration of the embodiments described below and the functions and the results (effects) achieved by the configuration are exemplary. The present disclosure can also be implemented by configurations other than those disclosed in the following embodiments. According to the present disclosure, in addition, at least one of a variety of effects (including derivative effects) obtained with such configurations can be obtained.

The following plurality of embodiments include similar constituent elements. In the following, such similar constituent elements are given common reference numerals to omit redundant description.

First Embodiment

Figure 1:
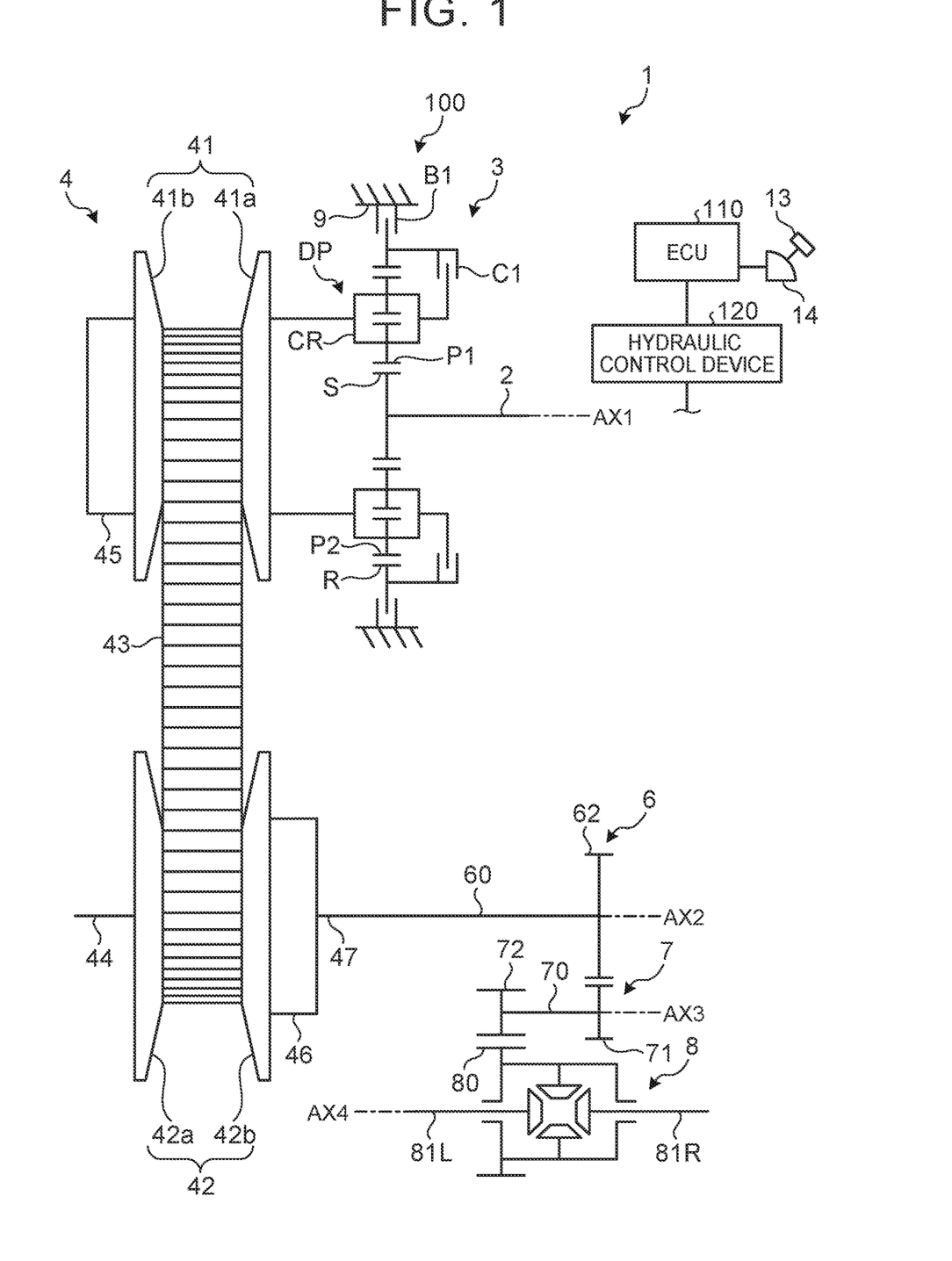
FIG. 1 is an exemplary schematic diagram illustrating a schematic configuration of an automatic transmission according to an embodiment.
Figure 2:
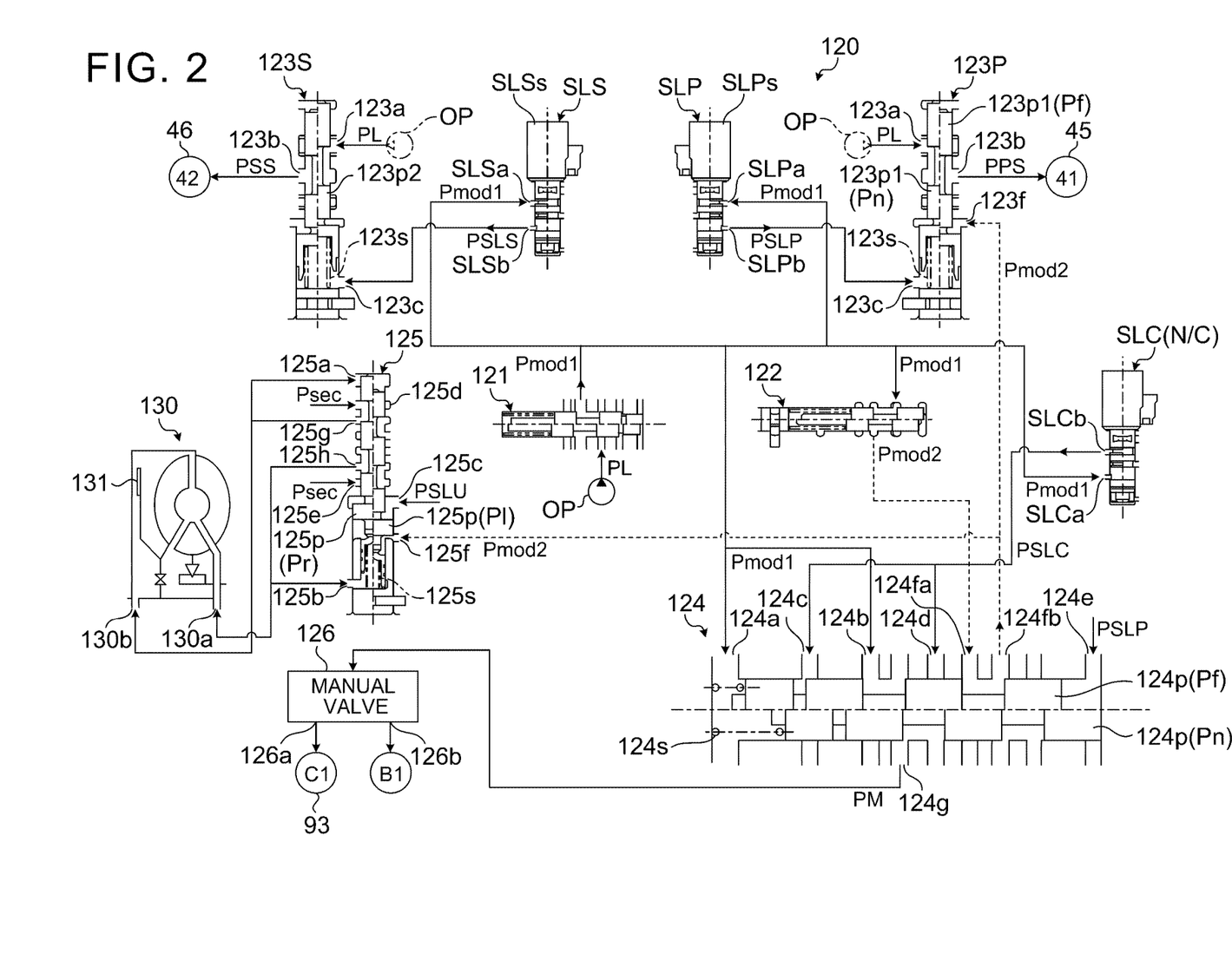
FIG. 2 is an exemplary schematic hydraulic circuit diagram of a hydraulic control device for an automatic transmission according to a first embodiment.

FIG. 1 illustrates a schematic configuration of an automobile 1 that includes an automatic transmission 100 according to an embodiment. FIG. 2 is a hydraulic circuit diagram of a hydraulic control device 120 for the automatic transmission 100 according to a first embodiment.

As illustrated in FIG. 1, the automatic transmission 100 includes a torque converter 130 (FIG. 2), a forward/reverse switching device 3 that has an input shaft 2, a continuously variable speed change mechanism 4, an output gear 6 that rotates together with a driving shaft 60, a reverse mechanism 7, a differential device 8, and a case 9 that houses such components. Rotary elements such as gears and sheaves included in the automatic transmission 100 are provided so as to be rotatable about rotational axes AX1 to AX4 that are parallel to each other. In addition, the automatic transmission 100 has a first clutch C1 which is an engagement element for forward travel, and a first brake B1 which is an engagement element for reverse travel.

Rotation of a crankshaft of an internal combustion engine (drive source) is transferred from an input shaft of the automatic transmission 100 to a primary pulley 41 of the continuously variable speed change mechanism 4 by way of the torque converter 130 and the forward/reverse switching device 3. In the continuously variable speed change mechanism 4, rotation of the primary pulley 41 is transferred to a secondary pulley 42 via a belt 43. Rotation of the secondary pulley 42 is output from drive shafts 81L and 81R by way of the output gear 6, the reverse mechanism 7, and the differential device 8.

As illustrated in FIG. 2, the torque converter 130 has a lock-up clutch 131, a lock-up on port 130a, and a lock-up off port 130b. When a lock-up on pressure (engagement pressure) is applied to the lock-up on port 130a, the lock-up clutch 131 is engaged to bring the torque converter 130 into a lock-up state. When a lock-up off pressure (disengagement pressure) is applied to the lock-up off port 130b, the lock-up clutch 131 is disengaged to cancel the lock-up state of the torque converter 130.

As illustrated in FIG. 1, the forward/reverse switching device 3 has a planetary gear DP. The planetary gear DP has a sun gear S that rotates together with the input shaft 2, a carrier CR that is coupled to a primary fixed sheave 41a and that rotatably supports pinion gears P1 and P2 which are meshed with each other, and a ring gear R. The carrier CR is rotated in accordance with meshing between the pinion gears P1 and P2 and the sun gear S and the ring gear R. The carrier CR is configured to be engageable with the ring gear R via the first clutch C1. In the case where the first clutch C1 is engaged, the carrier CR and the ring gear R are rotated together with each other. In addition, the ring gear R is configured to be engageable with the case 9 via the first brake B1. In the case where the first brake B1 is engaged, the ring gear R is made stationary with respect to the case 9. With such a forward/reverse switching device 3, a forward travel state is obtained by engaging the first clutch C1 and disengaging the first brake B1, and a reverse travel state is obtained by disengaging the first clutch C1 and engaging the first brake B1.

The continuously variable speed change mechanism 4 is a belt-type continuously variable automatic speed change mechanism that can continuously change the speed ratio. The continuously variable speed change mechanism 4 has the primary pulley 41, the secondary pulley 42, and the belt 43 which is endless and wound around the primary pulley 41 and the secondary pulley 42.

The primary pulley 41 has the primary fixed sheave 41a which is immovable in the axial direction and a primary movable sheave 41b that is movable in the axial direction, the primary fixed sheave 41a and the primary movable sheave 41b each having a wall surface formed in a conical shape to face each other. The belt 43 is held in a groove portion that has a V sectional surface formed by the primary fixed sheave 41a and the primary movable sheave 41b.

The secondary pulley 42 has a secondary fixed sheave 42a that is immovable in the axial direction and a secondary movable sheave 42b that is movable in the axial direction, the secondary fixed sheave 42a and the secondary movable sheave 42b each having a wall surface formed in a conical shape to face each other. The belt 43 is held in a groove portion that has a V sectional surface formed by the secondary fixed sheave 42a and the secondary movable sheave 42b.

A hydraulic servo 45 is disposed on the back surface side of the primary movable sheave 41b of the primary pulley 41. A hydraulic servo 46 is disposed on the back surface side of the secondary movable sheave 42b of the secondary pulley 42. A hydraulic pressure regulated by a primary pressure control valve 123P (FIG. 2) of the hydraulic control device 120 is applied to the hydraulic servo 45. A hydraulic pressure regulated by a secondary pressure control valve 123S (FIG. 2) of the hydraulic control device 120 is applied to the hydraulic servo 46. The hydraulic servo 45 is a piston-cylinder device that varies the position of the primary movable sheave 41b through hydraulic control. The hydraulic servo 46 is a piston-cylinder device that varies the position of the secondary movable sheave 42b through hydraulic control. The hydraulic servos 45 and 46 are configured to generate a belt holding force corresponding to load torque and a belt holding force for changing or fixing the speed ratio using the applied working oil pressure. The continuously variable speed change mechanism 4 controls the respective pulley widths of the primary pulley 41 and the secondary pulley 42 so as to be able to continuously change the speed ratio between the input shaft 2 and the driving shaft 60.

A gear 62 (output gear 6) fixed to the driving shaft 60 is meshed with a driven gear 71 fixed to a counter shaft 70 of the reverse mechanism 7. A drive gear 72 is fixed to the counter shaft 70, and the drive gear 72 is meshed with a differential ring gear 80 of the differential device 8.

The differential device 8 transfers rotation of the differential ring gear 80 to the left and right drive shafts 81L and 81R while absorbing the difference in rotation therebetween. The left and right drive shafts 81L and 81R are drivably coupled to wheels (not illustrated) to rotate together with the wheels at all times. The term "drivably coupled" indicates a state in which rotary elements are coupled to each other in such a manner that enables transfer of a drive force, which includes a state in which the rotary elements are coupled to each other so as to rotate together with each other, and a state in which the rotary elements are coupled to each other via a clutch or the like in such a manner that enables transfer of a drive force.

An ECU 110 has a CPU that serves as a control section or a computation processing section, a ROM and a RAM that serve as a main storage section, an auxiliary storage section, input and output ports, a communication port, etc. (not illustrated), for example. The ECU 110 can output various types of signals, such as a control signal for the hydraulic control device 120, from the output port. The automobile 1 is provided with a shift lever 13 that enables a driver to select a travel range, and a shift position detection section 14 that detects the shift position of the shift lever 13. The shift position detection section 14 is electrically connected to the ECU 110 via the input port.

The hydraulic control device 120 has a primary regulator valve and a secondary regulator valve (not illustrated). The primary regulator valve and the secondary regulator valve regulate a hydraulic pressure applied by an oil pump OP to a line pressure PL (by the primary regulator valve) and a secondary pressure Psec (by the secondary regulator valve) on the basis of a command value calculated by the ECU 110 on the basis of an accelerator operation amount etc.

As illustrated in FIG. 2, the hydraulic control device 120 includes a line pressure modulator valve 121, a solenoid modulator valve 122, a primary linear solenoid valve SLP (primary solenoid valve), a primary pressure control valve 123P, a secondary linear solenoid valve SLS (secondary solenoid valve), a secondary pressure control valve 123S, a linear solenoid valve SLC, a sequence valve 124, a lock-up pressure difference control valve 125, and a manual valve 126.

The line pressure modulator valve 121 regulates the line pressure PL, which is boosted by the oil pump OP, to obtain a first modulator pressure Pmod1, which is a constant pressure that is lower than the line pressure PL. The line pressure modulator valve 121 is an example of a first modulator valve. Although three oil pumps OP are drawn in FIG. 2 for convenience of illustration, there is only one oil pump OP in reality.

The solenoid modulator valve 122 regulates the first modulator pressure Pmod1 to obtain a second modulator pressure Pmod2, which is a constant pressure that is lower than the first modulator pressure Pmod1. The solenoid modulator valve 122 is an example of a second modulator valve.

The primary linear solenoid valve SLP has an electromagnetic solenoid SLPs, an input port SLPa, and an output port SLPb. The first modulator pressure Pmod1 is input to the input port SLPa. The output port SLPb outputs a primary control pressure PSLP to be input to the primary pressure control valve 123P. The primary linear solenoid valve SLP regulates the first modulator pressure Pmod1 to obtain the primary control pressure PSLP.

The primary pressure control valve 123P includes a spool 123p1 accommodated in a sleeve so as to be movable in the axial direction, and a spring 123s that urges the spool 123p1 toward one side in the axial direction. The primary pressure control valve 123P has an input port 123a, a control port 123c, and an output port 123b. The line pressure PL is input to the input port 123a. The primary control pressure PSLP is input to the control port 123c. The output port 123b outputs a primary pulley pressure PPS to be applied to the hydraulic servo 45 for the primary pulley 41. The primary pressure control valve 123P regulates the line pressure PL in accordance with the primary control pressure PSLP to obtain the primary pulley pressure PPS. The spool 123p1 is an example of a first valve element. The primary pulley pressure PPS is an example of a primary pressure.

In addition, the primary pressure control valve 123P has a fail-safe pressure input port 123f, to which the second modulator pressure Pmod2 which is regulated by the solenoid modulator valve 122 is input during a failure. In FIG. 2, a normal position (Pn) of the spool 123p1 is indicated on the right half of the spool 123p1, and a fail-safe position (Pf) of the spool 123p1 is indicated on the left half of the spool 123p1. The second modulator pressure Pmod2 is an example of a fail-safe pressure.

The secondary linear solenoid valve SLS has an electromagnetic solenoid SLSs, an input port SLSa to which the first modulator pressure Pmod1 is input, and an output port SLSb that outputs a secondary control pressure PSLS to be input to the secondary pressure control valve 123S. The secondary linear solenoid valve SLS regulates the first modulator pressure Pmod1 to obtain the secondary control pressure PSLS.

The secondary pressure control valve 123S has a spool 123p2 accommodated in a sleeve so as to be movable in the axial direction, and a spring 123s that urges the spool 123p2 toward one side in the axial direction. The secondary pressure control valve 123S has an input port 123a, a control port 123c, and an output port 123b. The line pressure PL is input to the input port 123a. The secondary control pressure PSLS is input to the control port 123c. The output port 123b outputs a secondary pulley pressure PSS to be applied to the hydraulic servo 46 for the secondary pulley 42. The secondary pressure control valve 123S regulates the line pressure PL in accordance with the secondary control pressure PSLS to obtain the secondary pulley pressure PSS. The spool 123p2 is an example of a second valve element. The secondary pulley pressure PSS is an example of a secondary pressure.

The linear solenoid valve SLC has an input port SLCa to which the first modulator pressure Pmod1 is input, and an output port SLCb that outputs a switching control pressure PSLC to be input to control ports 124c and 124d of the sequence valve 124. The linear solenoid valve SLC regulates the first modulator pressure Pmod1 to obtain the switching control pressure PSLC. The linear solenoid valve SLC is a normally closed (N/C) valve that is opened when a control signal is supplied and that is closed when the control signal is stopped. The linear solenoid valve SLC is an example of an electromagnetic control valve.

The sequence valve 124 has a spool 124p accommodated in a sleeve so as to be movable in the axial direction, and a spring 124s that urges the spool 124p toward one side in the axial direction. The sequence valve 124 has a first input port 124a, a second input port 124b, the control ports 124c and 124d, a third input port 124e, a fail-safe pressure input port 124fa, a fail-safe pressure output port 124fb, and an output port 124g. The first modulator pressure Pmod1 is input to the first input port 124a and the second input port 124b. The primary control pressure PSLP is input to the third input port 124e. The second modulator pressure Pmod2, which is obtained by the solenoid modulator valve 122, is input to the fail-safe pressure input port 124fa. The fail-safe pressure output port 124fb communicates with the fail-safe pressure input port 124fa to output the second modulator pressure Pmod2 during a failure. The output port 124g outputs a forward/reverse travel source pressure PM for executing the position and switching between forward travel and reverse travel during normal times. The spool 124p is movable between a normal position Pn (normal state) indicated on the lower half and a fail-safe position Pf (failure state) indicated on the upper half. The position of the spool 124p is varied in accordance with the balance of an applied hydraulic pressure. The spool 124p is configured so as to be positioned at the normal position Pn when the switching control pressure PSLC is applied, and positioned at the fail-safe position Pf when the application of the switching control pressure PSLC is stopped. The fail-safe pressure input port 124fa and the fail-safe pressure output port 124fb are blocked by the spool 124p in the normal state, and communicate with each other in the sleeve in the failure state. The sequence valve 124 is an example of a fail-safe valve. The spool 124p is an example of a fifth valve element. The fail-safe pressure output port 124fb is an example of a fail-safe port. The fail-safe position Pf of the spool 124p is an example of an open position. The normal position Pn of the spool 124p is an example of a block position.

The lock-up pressure difference control valve 125 includes a spool 125p accommodated in a sleeve so as to be movable in the axial direction, and a spring 125s that urges the spool 125p toward one side in the axial direction. The lock-up pressure difference control valve 125 has a first input port 125a, a second input port 125b, a third input port 125c, a fourth input port 125d, a fifth input port 125e, a fail-safe pressure input port 125f, a first output port 125g, and a second output port 125h. The lock-up off pressure is input to the first input port 125a. The lock-up on pressure is input to the second input port 125b. A lock-up pressure PSLU is input from a lock-up linear solenoid valve (not illustrated) to the third input port 125c. The secondary pressure Psec is input to the fourth input port 125d and the fifth input port 125e. The second modulator pressure Pmod2, which is obtained by the solenoid modulator valve 122, is input to the fail-safe pressure input port 125f during a failure. The first output port 125g outputs the lock-up off pressure. Meanwhile, the second output port 125h outputs the lock-up on pressure. The lock-up pressure difference control valve 125 regulates the lock-up pressure PSLU to control the state of engagement of the lock-up clutch 131. The spool 125$p$ is movable between a lock-up on position Pl indicated on the right half and a lock-up off position Pr indicated on the left half. When the spool 125$p$ is positioned at the lock-up on position Pl, the lock-up on pressure (engagement pressure) which is output from the second output port 125$h$ is input to the lock-up on port 130$a$ of the torque converter 130. When the spool 125$p$ is positioned at the lock-up off position Pr, on the other hand, the lock-up off pressure (disengagement pressure) which is output from the first output port 125$g$ is input to the lock-up off port 130$b$ of the torque converter 130. The lock-up pressure difference control valve 125 is an example of a lock-up control valve.

Next, operation of the hydraulic control device 120 in the normal state will be described. In the normal state, when the internal combustion engine is started, the line pressure PL and the secondary pressure Psec are obtained, and the first modulator pressure Pmod1 is obtained by the line pressure modulator valve 121. The first modulator pressure Pmod1 is input to the primary linear solenoid valve SLP, the sequence valve 124, and the secondary linear solenoid valve SLS. Further, the switching control pressure PSLC is input from the linear solenoid valve SLC to the sequence valve 124, and the sequence valve 124 is locked in the normal state. The switching control pressure PSLC is input from the sequence valve 124 to the manual valve 126 as the forward/reverse travel source pressure PM.

In the case where the shift position is switched from the P range to the D range, the engagement pressure is applied from the manual valve 126 to a hydraulic servo 93. Then, the ECU 110 outputs a control signal such that the primary linear solenoid valve SLP outputs the primary control pressure PSLP and the primary pulley pressure PPS which is regulated by the primary pressure control valve 123P is applied to the hydraulic servo 45 for the primary pulley 41. The ECU 110 also outputs a control signal such that the secondary linear solenoid valve SLS outputs the secondary control pressure PSLS and the secondary pulley pressure PSS which is regulated by the secondary pressure control valve 123S is applied to the hydraulic servo 46 for the secondary pulley 42. In this event, the spool 124$p$ is locked at the normal position Pn by the first modulator pressure Pmod1 which is applied to the first input port 124$a$ of the sequence valve 124. In addition, the ECU 110 determines whether or not to engage the lock-up clutch 131 of the torque converter 130 on the basis of the vehicle speed, the accelerator pedal operation amount, etc., and brings the torque converter 130 into a lock-up on state by performing control so as to apply the lock-up pressure PSLU, which is regulated by the linear solenoid valve (not illustrated), to the lock-up pressure difference control valve 125 in the case where the lock-up clutch 131 is to be engaged.

Next, operation of the hydraulic control device 120 for a case where the lock-up linear solenoid valve (not illustrated) which regulates the lock-up pressure PSLU is subjected to an on failure will be described. When an electromagnetic solenoid (not illustrated) of the lock-up linear solenoid valve becomes inoperable and the lock-up pressure difference control valve 125 is maintained in the lock-up on state, the lock-up clutch 131 is kept engaged and not switchable.

Thus, in the present embodiment, the fail-safe pressure output port 124$fb$ of the sequence valve 124 is connected to the fail-safe pressure input port 125$f$ of the lock-up pressure difference control valve 125.

In addition, the lock-up pressure difference control valve 125 is configured to output a lock-up off pressure with the spool 125$p$ positioned at the lock-up off position Pr when the second modulator pressure Pmod2 is input from the fail-safe pressure input port 125$f$. For example, the second modulator pressure Pmod2 is input to an oil chamber that faces a large diameter portion of the spool 125$p$ with a larger diameter than that of a small diameter portion thereof, and applied to the large diameter portion from the lower side in FIG. 2. Consequently, thrust directed upward in FIG. 2 acts on the spool 125$p$, to which the second modulator pressure Pmod2 is applied, and the spool 125$p$ is maintained at the lock-up off position Pr or moved from the lock-up on position Pl to the lock-up off position Pr.

The ECU 110 stops operation of the normally closed linear solenoid valve SLC upon detecting an on failure of the lock-up linear solenoid valve. As discussed above, the linear solenoid valve SLC is a normally closed electromagnetic control valve, and therefore the linear solenoid valve SLC stops outputting the switching control pressure PSLC. Consequently, the spool 124$p$ of the sequence valve 124 is moved from the normal position Pn to the fail-safe position Pf, and the sequence valve 124 outputs the second modulator pressure Pmod2 from the fail-safe pressure output port 124$fb$. Consequently, the second modulator pressure Pmod2 is input from the solenoid modulator valve 122 to the lock-up pressure difference control valve 125 via the sequence valve 124, and the spool 125$p$ of the lock-up pressure difference control valve 125 is positioned at the lock-up off position Pr, which maintains or cancels the lock-up state of the torque converter 130. In this manner, in the case where the lock-up linear solenoid valve (not illustrated) is subjected to an on failure, the ECU 110 can maintain or cancel the lock-up state of the torque converter 130 through control for closing the linear solenoid valve SLC.

Also in the case where the sequence valve 124 is in the failure state, the output port 124$g$ and the second input port 124$b$ communicate with each other in the sleeve, and therefore the forward/reverse travel source pressure PM which is based on the first modulator pressure Pmod1 can be applied from the output port 124$g$ to the manual valve 126. Hence, operation of the forward/reverse switching device 3 is ensured when the sequence valve 124 is in the failure state.

Next, operation of the hydraulic control device 120 for a case where the primary linear solenoid valve SLP and the secondary linear solenoid valve SLS (electromagnetic solenoids SLPs and SLSs) are subjected to an off failure will be described. When the primary linear solenoid valve SLP and the secondary linear solenoid valve SLS are in the off failure state with the oil pump OP in the normally operating state, the function of the primary pressure control valve 123P and the secondary pressure control valve 123S to regulate the line pressure PL is lost, and therefore the line pressure PL is applied to the hydraulic servo 45 and the hydraulic servo 46 in place of the primary pulley pressure PPS and the secondary pulley pressure PSS, respectively. In such a situation, there is a difference between the respective winding diameters of the belt 43 around the primary pulley 41 and the secondary pulley 42, and the winding diameter of the belt 43 around one of the primary pulley 41 and the secondary pulley 42 becomes larger while the winding diameter of the belt 43 around the other becomes smaller, depending on the characteristics for each model that matches the specifications etc. of the automatic transmission 100. In this case, if working oil is continuously supplied while there is a difference in the belt winding diameter between one side and the other side, there may be concentration of the bending stress on the belt around the pulley with the smaller belt winding diameter compared to the pulley with the larger belt winding diameter. In order to secure durability in consideration of such a failure, the rigidity and the strength of the belt 43, and hence the rigidity and the strength of the pulleys, must be increased, which may be a factor of an increase in the weight or the size of the belt 43 and the pulleys, and hence of the automatic transmission 100. Such an issue is distinguished with belt-type CVTs.

Thus, in the present embodiment, the fail-safe pressure output port 124fb is connected to the fail-safe pressure input port 123f of one (in the present embodiment, by way of example, the primary pressure control valve 123P) of the primary pressure control valve 123P and the secondary pressure control valve 123S. Such a configuration is an application example for a case where the automatic transmission 100 is configured such that the winding diameter of the belt 43 around the primary pulley 41 is larger than the winding diameter of the belt 43 around the secondary pulley 42 in the case where the line pressure PL (equal pressure) acts on the hydraulic servo 45 for the primary pulley 41 and the hydraulic servo 46 for the secondary pulley 42.

In addition, the primary pressure control valve 123P is configured such that the spool 123p1 is moved by the input of the second modulator pressure Pmod2 to lower the primary pulley pressure PPS. For example, the second modulator pressure Pmod2 is input to an oil chamber that faces a small diameter portion of the spool 123p1 provided on the upper side in FIG. 2 and a large diameter portion thereof provided on the lower side in FIG. 2 to be applied to the small diameter portion and the large diameter portion. Consequently, thrust directed downward in FIG. 2 acts on the spool 123p1 to which the second modulator pressure Pmod2 is applied, and the primary pressure control valve 123P is configured such that the flow path between the input port 123a and the output port 123b is narrowed as the spool 123p1 is moved downward in FIG. 2, for example.

The ECU 110 stops operation of the normally closed linear solenoid valve SLC upon detecting an off failure of the primary linear solenoid valve SLP and the secondary linear solenoid valve SLS. As discussed above, the linear solenoid valve SLC is a normally closed electromagnetic control valve, and therefore the linear solenoid valve SLC stops outputting the switching control pressure PSLC. Consequently, the spool 124p of the sequence valve 124 is moved from the normal position Pn to the fail-safe position Pf, and the fail-safe pressure input port 124fa and the fail-safe pressure output port 124fb communicate with each other. Consequently, the second modulator pressure Pmod2 is input from the solenoid modulator valve 122 to the primary pressure control valve 123P via the sequence valve 124, and the spool 123p1 of the primary pressure control valve 123P is moved, and the primary pulley pressure PPS is lowered, which reduces the winding diameter of the belt 43 around the primary pulley 41. In this manner, in the case where the primary linear solenoid valve SLP and the secondary linear solenoid valve SLS are subjected to an off failure, the ECU 110 can make the respective belt winding diameters around the primary pulley and the secondary pulley approximately equal to each other through control for closing the linear solenoid valve SLC.

As has been described above, the hydraulic control device 120 according to the present embodiment is an application example for a case where the automatic transmission 100 is configured such that the winding diameter of the belt 43 around the primary pulley 41 is larger than the winding diameter of the belt 43 around the secondary pulley 42 in the case where the line pressure PL (equal pressure) acts on the hydraulic servo 45 for the primary pulley 41 and the hydraulic servo 46 for the secondary pulley 42. In this case, in the present embodiment, in the case where the electromagnetic solenoids SLPs and SLSs (electromagnetic actuators) of the primary linear solenoid valve SLP and the secondary linear solenoid valve SLS become inoperable, the sequence valve 124 (fail-safe valve) applies the second modulator pressure Pmod2 (fail-safe pressure) to the spool 123p1 (valve element) of the primary pressure control valve 123P to vary its position in order to reduce the difference between the respective winding diameters around the primary pulley 41 and the secondary pulley 42 because of a reduction in the primary pulley pressure PPS. Hence, according to the present embodiment, it is possible to reduce the difference between the respective winding diameters of the belt 43 around the primary pulley 41 and the secondary pulley 42 through hydraulic control during a failure, and to make the respective belt winding diameters around the primary pulley and the secondary pulley approximately equal to each other. Hence, the durability can be improved while suppressing an increase in the size or the weight of the belt 43, the primary pulley 41, and the secondary pulley 42, for example.

In the present embodiment, in addition, in the case where the electromagnetic solenoid (third electromagnetic actuator) of the lock-up linear solenoid valve becomes inoperable when the lock-up on pressure (engagement pressure) is applied to the lock-up clutch 131, the sequence valve 124 applies the second modulator pressure Pmod2 to the spool 125p (third valve element) of the lock-up pressure difference control valve 125 to vary its position so that the lock-up off pressure (disengagement pressure) is applied to the lock-up clutch 131. Hence, according to the present embodiment, the lock-up state of the torque converter 130 can be maintained or canceled even in the case where the lock-up linear solenoid valve (not illustrated) is subjected to an on failure, for example. In addition, countermeasures against an off failure of the primary linear solenoid valve SLP and the secondary linear solenoid valve SLS and countermeasures against an on failure of the lock-up linear solenoid valve (not illustrated) can be taken using the single sequence valve 124. Thus, the hydraulic control device 120 can advantageously be configured simply or compactly, for example, compared to a case where such countermeasures are taken using separate valves or the like.

In the present embodiment, in addition, the fail-safe pressure is the second modulator pressure Pmod2 which is lower than the first modulator pressure Pmod1. In the case where the fail-safe pressure is a relatively high pressure such as the line pressure PL, it may be difficult to adjust the pressure receiving area of the valve element by reducing the diameter of a portion of a valve element of a valve to which the fail-safe pressure is applied or, conversely, increasing the diameter of a portion of the valve element to which a pressure that opposes the fail-safe pressure is applied, set the specifications of a spring that are suitable for thrust of the valve element due to the fail-safe pressure, etc., for example. In this respect, according to the present embodiment, the fail-safe pressure is the second modulator pressure Pmod2 which is lower than the line pressure PL etc., and therefore it is advantageously relatively easy to set the size of the pressure receiving area of the valve element, the specifications of the spring, etc.

In the present embodiment, in addition, the spool 124*p* (fifth valve element) of the sequence valve 124 is configured such that the fail-safe pressure output port 124*fb* (fail-safe port) is positioned at the normal position Pn (block position) in the case where the switching control pressure PSLC is applied from the normally closed linear solenoid valve SLC (electromagnetic control valve), and such that the fail-safe pressure output port 124*fb* is opened to output the second modulator pressure Pmod2 in the case where the application of the switching control pressure PSLC from the normally closed linear solenoid valve SLC is stopped. Hence, according to the present embodiment, it is possible to implement the fail-safe function discussed above which uses the output of the second modulator pressure Pmod2 discussed above, that is, the fail-safe function for an off failure of the primary linear solenoid valve SLP and the secondary linear solenoid valve SLS (electromagnetic solenoids SLPs and SLSs) and an on failure of the lock-up linear solenoid valve (not illustrated), with a relatively simple configuration also in the case where the linear solenoid valve SLC becomes inoperable, in addition to the case where the ECU 110 detects a failure.

Second Embodiment

Figure 3:
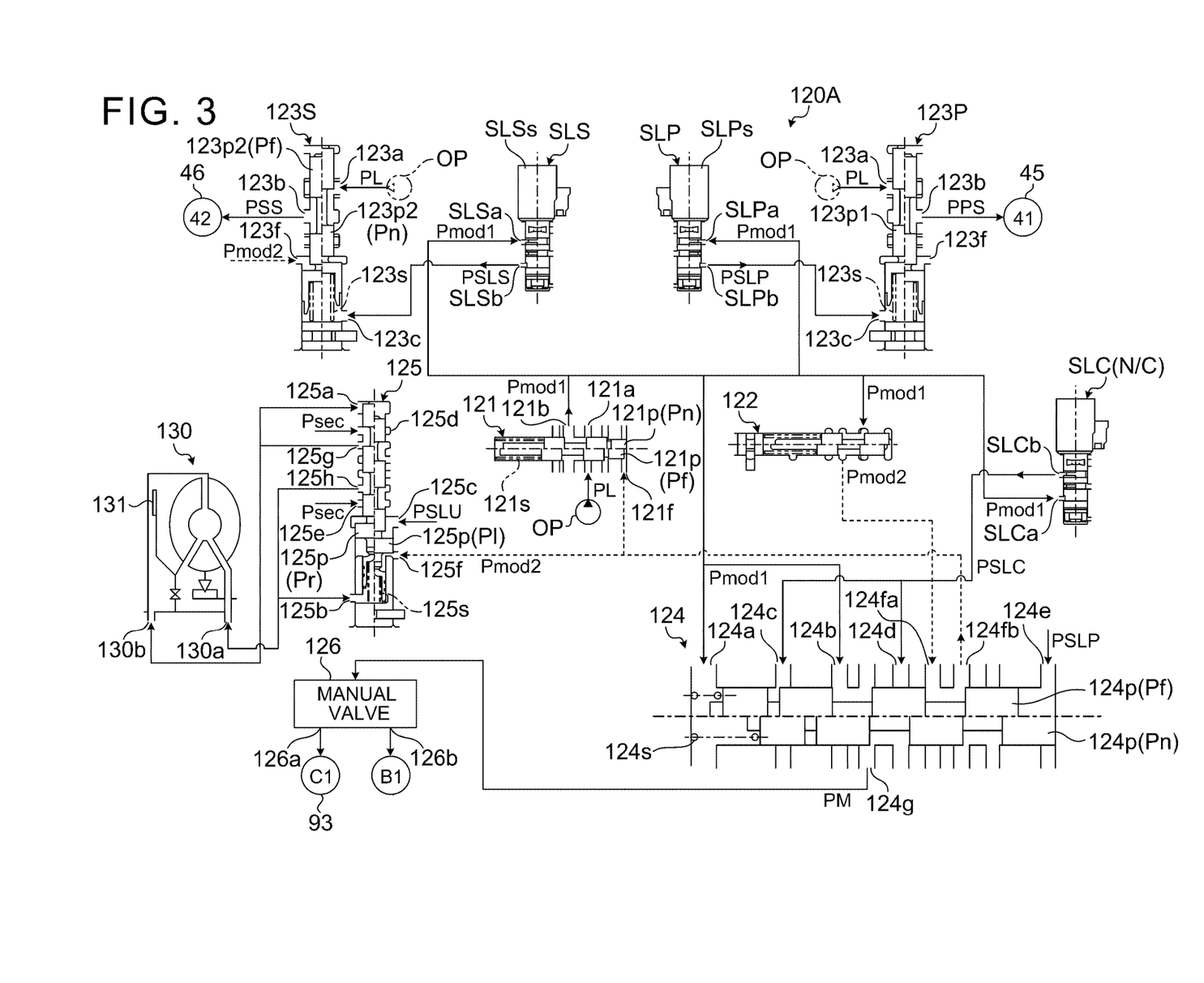
FIG. 3 is an exemplary schematic hydraulic circuit diagram of a hydraulic control device for an automatic transmission according to a second embodiment.

FIG. 3 is a hydraulic circuit diagram of a hydraulic control device 120A for the automatic transmission 100 according to a second embodiment. The hydraulic control device 120A according to the present embodiment has constituent elements that are similar to those of the hydraulic control device 120 according to the first embodiment. Hence, similar effects based on components that are similar to those according to the first embodiment can be obtained with the present embodiment.

The hydraulic control device 120A according to the present embodiment is an application example for a case where the automatic transmission 100 is configured such that the winding diameter of the belt 43 around the secondary pulley 42 is larger than the winding diameter of the belt 43 around the primary pulley 41 in the case where the line pressure PL (equal pressure) acts on the hydraulic servo 45 for the primary pulley 41 and the hydraulic servo 46 for the secondary pulley 42. Thus, in the present embodiment, the fail-safe pressure output port 124*fb* is connected to the fail-safe pressure input port 123*f* of the other (in the present embodiment, by way of example, the secondary pressure control valve 123S) of the primary pressure control valve 123P and the secondary pressure control valve 123S. The secondary pressure control valve 123S is configured similarly to the primary pressure control valve 123P according to the first embodiment.

The ECU 110 stops operation of the normally closed linear solenoid valve SLC upon detecting an off failure of the primary linear solenoid valve SLP and the secondary linear solenoid valve SLS. Consequently, the second modulator pressure Pmod2 is input from the solenoid modulator valve 122 to the secondary pressure control valve 123S via the sequence valve 124, the spool 123*p*2 of the secondary pressure control valve 123S is moved from the normal position Pn to the fail-safe position Pf, and the secondary pulley pressure PSS is lowered, which reduces the winding diameter of the belt 43 around the secondary pulley 42. In this manner, in the case where the primary linear solenoid valve SLP and the secondary linear solenoid valve SLS are subjected to an off failure, the ECU 110 can make the respective belt winding diameters around the primary pulley and the secondary pulley approximately equal to each other by making the winding diameter around one of the primary pulley 41 and the secondary pulley 42 larger than the winding diameter around the other through control for closing the linear solenoid valve SLC.

In the present embodiment, in addition, the line pressure modulator valve 121 which regulates the line pressure PL to obtain the first modulator pressure Pmod1 includes a spool 121*p* accommodated in a sleeve so as to be movable in the axial direction, and a spring 121*s* that urges the spool 121*p* toward one side in the axial direction. The line pressure modulator valve 121 has an input port 121*a*, an output port 121*b*, and a fail-safe pressure input port 121*f*. The line pressure PL is input to the input port 121*a*. The output port 121*b* outputs the first modulator pressure Pmod1. The second modulator pressure Pmod2 is input to the fail-safe pressure input port 121*f* during a failure. The spool 121*p* is an example of a fourth valve element.

The line pressure modulator valve 121 is configured such that the spool 121*p*1 is moved by the input of the second modulator pressure Pmod2 to lower the first modulator pressure Pmod1. For example, the second modulator pressure Pmod2 is input to an oil chamber positioned at the right end, in FIG. 3, of the spool 121*p*, and applied to the spool 121*p* toward the left side in FIG. 3. Consequently, thrust directed leftward in FIG. 3 acts on the spool 121*p*, to which the second modulator pressure Pmod2 is applied, to move the spool 121*p*. Further, the line pressure modulator valve 121 is configured such that the flow path between the input port 121*a* and the output port 121*b* is narrowed as the spool 121*p* is moved leftward in FIG. 3, for example. The primary control pressure PSLP and the secondary control pressure PSLS are lowered, and hence the primary pressure pulley PPS and the secondary pulley pressure PSS are lowered, along with a reduction in the first modulator pressure Pmod1.

As has been described above, the hydraulic control device 120A according to the present embodiment is an application example for a case where the automatic transmission 100 is configured such that the winding diameter of the belt 43 around the secondary pulley 42 is larger than the winding diameter of the belt 43 around the primary pulley 41 in the case where the line pressure PL (equal pressure) acts on the hydraulic servo 45 for the primary pulley 41 and the hydraulic servo 46 for the secondary pulley 42. In this case, in the present embodiment, in the case where the electromagnetic solenoids SLPs and SLSs (electromagnetic actuators) of the primary linear solenoid valve SLP and the secondary linear solenoid valve SLS become inoperable, the sequence valve 124 (fail-safe valve) applies the second modulator pressure Pmod2 (fail-safe pressure) to the spool 123*p*2 (valve element) of the secondary pressure control valve 123S to vary its position in order to reduce the difference between the respective winding diameters around the primary pulley 41 and the secondary pulley 42 because of a reduction in the secondary pulley pressure PSS. Hence, according to the present embodiment, it is possible to reduce the difference between the respective winding diameters of the belt 43 around the primary pulley 41 and the secondary pulley 42 through hydraulic control during a failure, and to make the respective belt winding diameters around the primary pulley and the secondary pulley approximately equal to each other. Hence, the durability can be improved while suppressing an increase in the size or the weight of the belt 43, the primary pulley 41, and the secondary pulley 42, for example.

In the present embodiment, according to the present embodiment, in addition, in the case where the electromagnetic solenoids SLPs and SLSs (electromagnetic actuators) of the primary linear solenoid valve SLP and the secondary linear solenoid valve SLS become inoperable, the sequence valve 124 (fail-safe valve) applies the second modulator pressure Pmod2 to the spool 121$p$ (fourth valve element) of the line pressure modulator valve 121 to vary its position in order to reduce the first modulator pressure Pmod1. Hence, according to the present embodiment, the first modulator pressure Pmod1 is lowered along with a reduction in the first modulator pressure Pmod1, which lowers the working hydraulic pressure for the hydraulic servos 45 and 46. Hence, it is possible to reduce the force for holding the belt 43 with the primary fixed sheave 41*a* and the primary movable sheave 41*b* and the force for holding the belt 43 with the secondary fixed sheave 42*a* and the secondary movable sheave 42*b*, and therefore it is possible to improve the durability of the belt 43, the primary pulley 41, and the secondary pulley 42, for example.

While the embodiments of the present disclosure have been described above, the embodiments are exemplary, and are not intended to limit the scope of the disclosure. The embodiments can be made in various other forms, and a variety of omissions, replacements, combinations, and changes may be made without departing from the scope of the disclosure. The configurations and the shapes in the examples are partially interchangeable. The specifications such as configuration and shape (such as structure, type, direction, shape, size, length, width, height, number, arrangement, and position) may be changed as appropriate.

For example, in the embodiments, the primary pressure control valve, the secondary pressure control valve, the lock-up control valve, and the sequence valve are each a pilot electromagnetic valve. However, the present disclosure is also applicable to a configuration in which at least one of such valves is a direct-acting valve. The configuration of the valves is not limited to that according to the embodiments, and may be changed variously. While the second modulator pressure is used as the fail-safe pressure, a different regulated hydraulic pressure such as the line pressure or the first modulator pressure may also be used.

In addition, the hydraulic control device may include a fail-safe valve that varies the position of the first valve element by draining an applied pressure such that the primary pressure is reduced in the case where the first electromagnetic actuator and the second electromagnetic actuator become inoperable, in place of a fail-safe valve that varies the position of the first valve element by applying a fail-safe pressure.

In addition, the hydraulic control device may include a fail-safe valve that varies the position of the second valve element by draining an applied pressure such that the secondary pressure is reduced in the case where the first electromagnetic actuator and the second electromagnetic actuator become inoperable, in place of a fail-safe valve that varies the position of the second valve element by applying a fail-safe pressure.

The invention claimed is:

1. A hydraulic control device for an automatic transmission that has a primary pulley that includes a primary fixed sheave and a primary movable sheave, a secondary pulley that includes a secondary fixed sheave and a secondary movable sheave, and an endless belt wound as interposed between the primary fixed sheave and the primary movable sheave and wound as interposed between the secondary fixed sheave and the secondary movable sheave, the automatic transmission being configured such that a winding diameter of the belt around the primary pulley is larger than a winding diameter of the belt around the secondary pulley when a primary pressure for varying a position of the primary movable sheave in an axial direction and a secondary pressure for varying a position of the secondary movable sheave in the axial direction are equal to each other, the hydraulic control device comprising:
   a primary pressure control valve that has a first valve element and that regulates the primary pressure by varying a position of the first valve element in accordance with operation of a first electromagnetic actuator;
   a secondary pressure control valve that has a second valve element and that regulates the secondary pressure by varying a position of the second valve element in accordance with operation of a second electromagnetic actuator; and
   a fail-safe valve that varies the position of the first valve element such that the primary pressure is reduced such that the winding diameter of the belt around the primary pulley and the winding diameter of the belt around the secondary pulley are equal when the first electromagnetic actuator and the second electromagnetic actuator become inoperable.

2. The hydraulic control device according to claim 1, wherein
   the fail-safe valve varies the position of the first valve element by applying a fail-safe pressure such that the primary pressure is reduced when the first electromagnetic actuator and the second electromagnetic actuator become inoperable.

3. The hydraulic control device according to claim 1, wherein:
   the automatic transmission has a torque converter and a lock-up clutch;
   the hydraulic control device further includes a lock-up control valve that has a third valve element and that switches between a state, in which an engagement pressure for engaging the lock-up clutch is applied to the lock-up clutch, and a state, in which a disengagement pressure for disengaging the lock-up clutch is applied to the lock-up clutch, by varying a position of the third valve element in accordance with operation of a third electromagnetic actuator; and
   the fail-safe valve applies a fail-safe pressure to the third valve element to vary a position of the third valve element so as to achieve the state in which the disengagement pressure is applied when the third electromagnetic actuator becomes inoperable in the state in which the engagement pressure is applied.

4. The hydraulic control device according to claim 1, further comprising:
   a first modulator valve that has a fourth valve element and that regulates a first modulator pressure in accordance with variations in a position of the fourth valve element, wherein:
   the primary pressure control valve regulates the primary pressure from the first modulator pressure, and the secondary pressure control valve regulates the secondary pressure from the first modulator pressure; and
   the fail-safe valve applies a fail-safe pressure to the fourth valve element to vary the position of the fourth valve element such that the first modulator pressure is reduced when the first electromagnetic actuator and the second electromagnetic actuator become inoperable.

5. The hydraulic control device according to claim 4, further comprising:

a second modulator valve that regulates a second modulator pressure, which is lower than the first modulator pressure, from the first modulator pressure, wherein the fail-safe pressure is the second modulator pressure.

6. The hydraulic control device according to claim 1, wherein:
the fail-safe valve has a fifth valve element that is movable between an open position, at which a fail-safe port is opened to apply a fail-safe pressure to one of the first valve element and the second valve element, and a block position, at which the fail-safe port is blocked; and
the fifth valve element is positioned at the block position when a switching control pressure is applied from a normally closed electromagnetic control valve, and positioned at the open position when application of the switching control pressure from the normally closed electromagnetic control valve is stopped.

7. The hydraulic control device according to claim 1, wherein:
working oil discharged from an oil pump is supplied to the primary pressure control valve and the secondary pressure control valve; and
the primary pressure control valve and the secondary pressure control valve each regulate the pressure by varying the position of the valve element of the pressure control valve.

8. A hydraulic control device for an automatic transmission that has a primary pulley that includes a primary fixed sheave and a primary movable sheave, a secondary pulley that includes a secondary fixed sheave and a secondary movable sheave, and an endless belt wound as interposed between the primary fixed sheave and the primary movable sheave and wound as interposed between the secondary fixed sheave and the secondary movable sheave, the automatic transmission being configured such that a winding diameter of the belt around the secondary pulley is larger than a winding diameter of the belt around the primary pulley when a primary pressure for varying a position of the primary movable sheave in an axial direction and a secondary pressure for varying a position of the secondary movable sheave in the axial direction are equal to each other, the hydraulic control device comprising:
a primary pressure control valve that has a first valve element and that regulates the primary pressure for varying the position of the primary movable sheave in the axial direction by varying a position of the first valve element in accordance with operation of a first electromagnetic actuator;
a secondary pressure control valve that has a second valve element and that regulates the secondary pressure for varying the position of the secondary movable sheave in the axial direction by varying a position of the second valve element in accordance with operation of a second electromagnetic actuator; and
a fail-safe valve that varies the position of the second valve element such that the secondary pressure is reduced such that the winding diameter of the belt around the secondary pulley and the winding diameter of the belt around the primary pulley are equal when the first electromagnetic actuator and the second electromagnetic actuator become inoperable.

9. The hydraulic control device according to claim 8, wherein
the fail-safe valve varies the position of the second valve element by applying a fail-safe pressure such that the secondary pressure is reduced when the first electromagnetic actuator and the second electromagnetic actuator become inoperable.

10. The hydraulic control device according to claim 8, wherein:
the automatic transmission has a torque converter and a lock-up clutch;
the hydraulic control device further includes a lock-up control valve that has a third valve element and that switches between a state, in which an engagement pressure for engaging the lock-up clutch is applied to the lock-up clutch, and a state, in which a disengagement pressure for disengaging the lock-up clutch is applied to the lock-up clutch, by varying a position of the third valve element in accordance with operation of a third electromagnetic actuator; and
the fail-safe valve applies a fail-safe pressure to the third valve element to vary a position of the third valve element so as to achieve the state in which the disengagement pressure is applied when the third electromagnetic actuator becomes inoperable in the state in which the engagement pressure is applied.

11. The hydraulic control device according to claim 8, further comprising:
a first modulator valve that has a fourth valve element and that regulates a first modulator pressure in accordance with variations in a position of the fourth valve element, wherein:
the primary pressure control valve regulates the primary pressure from the first modulator pressure, and the secondary pressure control valve regulates the secondary pressure from the first modulator pressure; and
the fail-safe valve applies a fail-safe pressure to the fourth valve element to vary the position of the fourth valve element such that the first modulator pressure is reduced when the first electromagnetic actuator and the second electromagnetic actuator become inoperable.

12. The hydraulic control device according to claim 11, further comprising:
a second modulator valve that regulates a second modulator pressure, which is lower than the first modulator pressure, from the first modulator pressure, wherein the fail-safe pressure is the second modulator pressure.

13. The hydraulic control device according to claim 8, wherein:
the fail-safe valve has a fifth valve element that is movable between an open position, at which a fail-safe port is opened to apply a fail-safe pressure to one of the first valve element and the second valve element, and a block position, at which the fail-safe port is blocked; and
the fifth valve element is positioned at the block position when a switching control pressure is applied from a normally closed electromagnetic control valve, and positioned at the open position when application of the switching control pressure from the normally closed electromagnetic control valve is stopped.

14. The hydraulic control device according to claim 8, wherein:
working oil discharged from an oil pump is supplied to the primary pressure control valve and the secondary pressure control valve; and
the primary pressure control valve and the secondary pressure control valve each regulate the pressure by varying the position of the valve element of the pressure control valve.

* * * * *